United States Patent [19]

Leppert et al.

[11] Patent Number: 5,296,163
[45] Date of Patent: Mar. 22, 1994

[54] METHOD FOR PRODUCING A SCINTILLATOR CERAMIC

[75] Inventors: Juergen Leppert, Inning A. Holz; Wolfgang Rossner, Holzkirchen, both of Fed. Rep. of Germany

[73] Assignee: Siemens Aktiengesellschaft, Munich, Fed. Rep. of Germany

[21] Appl. No.: 96,271

[22] Filed: Jul. 26, 1993

[30] Foreign Application Priority Data

Jul. 28, 1992 [DE] Fed. Rep. of Germany ....... 4224931

[51] Int. Cl.$^5$ ............................................. C09K 11/08
[52] U.S. Cl. .................................... 252/301.4 S; 264/21
[58] Field of Search ..................... 252/301.4 S; 264/21

[56] References Cited

U.S. PATENT DOCUMENTS

| | | | |
|---|---|---|---|
| 3,502,590 | 3/1970 | Royce et al. ...................... | 252/301.4 |
| 3,878,280 | 4/1975 | Dutta et al. ............................ | 264/65 |
| 4,242,221 | 12/1980 | Cusano et al. .................... | 252/301.4 |
| 4,733,088 | 3/1988 | Yamada et al. ................... | 250/483.1 |
| 4,863,882 | 9/1989 | Matsuda et al. ...................... | 501/94 |
| 4,888,121 | 12/1989 | Yale ............................... | 252/301.6 S |
| 5,075,267 | 12/1991 | Fujii et al. ........................... | 501/126 |

FOREIGN PATENT DOCUMENTS

| | | |
|---|---|---|
| 3629180 | 4/1989 | Fed. Rep. of Germany . |
| 3702357 | 5/1989 | Fed. Rep. of Germany . |
| 1375052 | 11/1974 | United Kingdom . |

*Primary Examiner*—Karl Group
*Assistant Examiner*—Chris Gallo
*Attorney, Agent, or Firm*—Hill, Steadman & Simpson

[57] ABSTRACT

For manufacturing a scintillator ceramic of a rare earth oxisulfide, a pigment powder is compressed by single-axis hot-pressing to form a ceramic member having at least 99.9% of the theoretic density, the pigment powder having the general formula $(M_{1-x}Ln_x)_2O_2S$, whereby M denotes at least one element from the group Y, La and Gd, Ln represents at least one element from the group Eu, Ce, Pr, Tb, Yb, Dy, Sm and Ho, and whereby $1 \times 10^{-6} \leq x \leq 2 \times 10^{-1}$, and the powder having a specific surface according to BET of at least 10 $m^{-2}/g$.

14 Claims, 2 Drawing Sheets

3 μm

3 µm

METHOD FOR PRODUCING A SCINTILLATOR CERAMIC

BACKGROUND OF THE INVENTION

1. Field of the Invention

The present invention is directed to producing a scintillator ceramic for use in a scintillator member for detecting high-energy radiation, for example x-rays, gamma rays and electron beams.

2. Description of the Prior Art

Scintillator members for detecting high energy radiation contain a phosphor that can absorb the high-energy radiation and convert it into visible light. The luminescent emission thereby generated is electronically acquired and evaluated with the assistance of light-sensitive systems such as photodiodes or photomultipliers. Such scintillator members can be manufactured of single-crystal materials, for example, doped alkali halides. Non-single-crystal materials can be employed as powdered phosphor or in the form of ceramic members manufactured therefrom.

Scintillator ceramics consisting of pigment powders of the rare earth oxisulfides that obey the general total formula $$(M_{1-x}Ln_x)_2O_2S$$

are well-suited for highly sensitive radiation detectors as required, for example, in x-ray computer tomography. In this formula, M stands for at least one element from the group of rare earths and Ln stands for at least one element suitable as an activator from the group of europium, cerium, praseodymium, terbium, ytterbium, dysprosium, samarium and holmium, whereby x can assume a value up to $2 \times 10^{-1}$. The scintillator ceramic should have an optical transmission characteristic of translucent through transparent for a high light yield in the conversion of the high-energy radiation, in order to assure a high transmissivity of the luminescent emission within the scintillator member.

Further, a high quantum efficiency is required in the conversion, whereas an excessive afterglow is undesired.

A high transparency of the scintillator member can only be achieved with a high-density ceramic that has optimally low residual porosity. In addition to a crystal anisotropy of the optical refractive index due to non-uniform crystal structure, foreign phase inclusions as well as grain boundaries and, in particular, pores are disruptive for an optimum transmission of the luminescent emission.

German OS 36 29 180 discloses a method for manufacturing a scintillator ceramic of phosphor powders of the rare earth oxisulfides. In this known method powdered scintillator material, which is acquired according to a conventional flux process, is enclosed vacuum-tight in a metal container and is isostatically pressed therein at a temperature from 800° through 1700° C. and a pressure of 50 through 200 Mpa. In order to obtain an optimally high compression of the powdered scintillator material, a compression additive, for example a complex alkali fluoride, is previously added thereto, prior to compression, in a weight proportion up to 10%. A scintillator ceramic is thus obtained that has a residual porosity below 4% by volume, but which still has individual foreign phase inclusions due to the compression additive and therefore does not have an optimum transmission for visible light.

In addition, disadvantages also exist in this known process, since isostatic hot-pressing is technologically complicated and, for example, requires a 200 Mpa high-pressure technique. Further time-consuming and cost-intensive steps are molding the pigment powder in a metal container that is gastight at high-pressure, and the subsequent unmolding (removal) of the scintillator member from the container.

SUMMARY OF THE INVENTION

It is an object of the present invention to provide a method for the compression of pigment powders of the rare earth oxisulfides which is simpler to implement that known methods and which can be implemented without employing compression additives, and which leads to a highly light-transmissive scintillator ceramic.

The above object is achieved in accordance with the principles of the present invention in a method for producing a high-density scintillation ceramic of a rare earth oxisulfide, wherein a pigment powder is provided having the general formula $(M_{1-x}Ln_x)_2O_2S$, M being at least one element selected from the group of Y, La and Gd, Ln is at least one element from the group Eu, Ce, Pr, Tb, Yb, Dy, Sm and Ho, and wherein $1 \times 10^{-6} \leq x \leq 2 \times 10^{-1}$, the powder having a specific surface of at least 10 m²/g determined with the gas absorption method according to BET, and wherein the powder is compressed by single-access hot-pressing to form a translucent ceramic member having a density of at least 99.9% of the theoretical density.

Without employing compression additives or sintering aids, pigment powders can be compressed to a high-density ceramic having 99.9% or more of the theoretical density with the method of the invention. The scintillator member is optically translucent and exhibits no foreign phase inclusions. It has a regular columnar through globular grain structure having average grain sizes of approximately 50 μm. Since the scintillator ceramic also exhibits a high light emission given the influence of, for example, x-radiation, it is well-suited for the manufacture of radiation detectors that can be utilized, for example, in x-ray computer tomography.

The method itself is easy to implement. An hydraulic hot press is adequate for pressing, this being substantially less complicated than the high-pressure system required in the prior art. As a consequence of the simple method sequences, particularly of the highly simplified unmolding, the method is also less time-consuming and can be implemented extremely economically overall.

The success of the method of the invention is surprising insofar as scintillator ceramics having a relatively low density heretofore of 90 through 98% of the theoretical density could only be obtained by hot-pressing conventionally produced pigment powders. Conventional phosphor pigment powder is acquired according to flux methods as disclosed, for example, by U.S. Pat. No. 3,502,590. A reaction of prescribed educts to form the phosphor pigment powder is achieved by adding compounds having a low melting point in their fluid state. The pigment powders contain pigment grains having a regular polyhedral shape with average grain sizes between 8 and 40 μm. The specific surface of such phosphor pigment powders is less than 2 m²/g.

The method of the invention can only be implemented when the pigment powder employed has a specific surface of at least 10 m²/g (according to BET).

Such pigment powders have not previously been obtained in known methods. The preparation of a pigment powder suitable for the invention is accomplished by modifying a sulfite precipitation reduction method as disclosed, for example, by GB 1 375 052.

Due to the large specific surface, such a powder has a multitude of non-saturated bonds at the outer and "inner" surface that lead to a high sinter activity of the powder.

Powders manufactured with the modified sulfite precipitation method have specific surfaces greater than 10 m$^2$/g through approximately 50 m$^2$/g and, typically, between 20 and 30 m$^2$/g (according to BET).

The powder resulting from the process, which has an exact stoichiometry without foreign phases, is filled before pressing into an extrusion die of aluminum oxide, tantalum, tungsten, molybdenum, silicon carbide or silicon nitride in order to preclude a possible chemical reaction of the powder with the steel of the press given the conditions employed for pressing.

The pressing process itself can ensue in two phases, whereby a dry and cold, single-axis pre-pressing ensues first at a pressure from 0.1 through 10 kN cm$^{-2}$, preferably at a pressure from 1 through 3 kN cm$^{-2}$, and a complete compression by single-axis hot-pressing at a temperature from 1000° through 1500° C., preferably 1100° through 1300° C., and a pressure from 0.1 through 20 kN cm$^{-2}$, preferably at 2 through 6 kN cm$^{-2}$, following thereafter.

In a further embodiment of the invention, an unpressurized sintering process can be implemented between the cold pre-pressing and the hot-pressing, the pre-pressed pigment powder being heated therein to a temperature of 1000° through 1500° C. without pressure. A compression to 75 through 90% of the theoretical density thereby ensues as a result of the sintering. The hot-pressing subsequently ensues.

In an advantageous but not compulsory, further development of the invention, a compression additive is added to the pigment powder before the hot-pressing. Materials suitable for this purpose are disclosed, for example, in German OS 36 29 180 and are selected from the group of complex fluorides with germanium, phosphorous, aluminum, silicon, zirconium, titanium and boron as the central atom and alkali or earth alkali cations. Compared to the known method, the compression of the scintillation ceramic of the invention is successfully accomplished at a lower temperature with the assistance of this compression additive (or sintering aid), or a higher density of the scintillator ceramic is achieved with the compression additive given unaltered temperature. The lower temperature during compression in turn has the advantage that a correspondingly manufactured scintillator member exhibits a better luminescence and less afterglow.

The compression additive is substantially completely removed from the scintillator member during the sintering, during the hot-pressing, since it is volatile at the residual gas pressure and the sintering temperatures employed. Although a (mechanical) pressure acts on the pigment powder to be compressed during hot-pressing, a vacuum having a residual gas pressure of less than 10 pa is simultaneously applied. The highly volatile compression additive can thus be substantially completely removed, which is not possible with conventional manufacturing methods on the basis of isostatic hot-pressing since this is implemented given a high gas acting on adjacent at all sides.

The cold pre-pressing of the pigment powder can be implemented in an inert gas atmosphere such as nitrogen, argon, helium or hydrogen.

DESCRIPTION OF THE PREFERRED EMBODIMENTS

Figure 1:
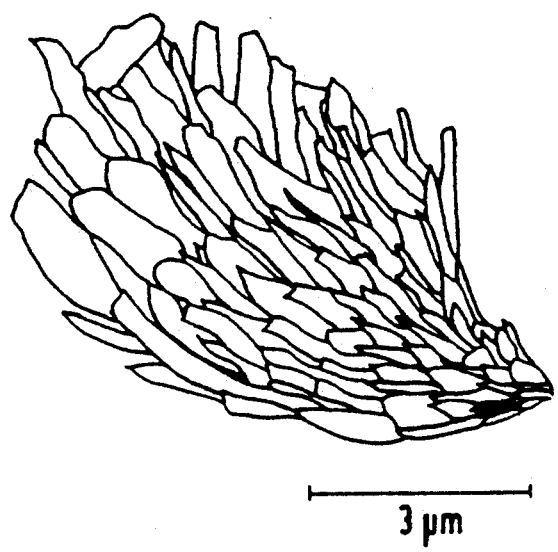
FIG. 1 shows a pigment grain of a phosphor pigment powder of the invention.

The inventive phosphor pigment powder, one pigment grain thereof being shown in FIG. 1, has a large specific surface (i.e. the surface per mass unit) as a consequence of its finely articulated needle-shaped to laminar morphology. By contrast to the phosphor pigment powder of the prior art, which has a globular morphology (see, for example, Y. Ito et al, Jap. Journal Appl. Physics, Vol. 27, No. 8, 1988, p. L1371 through L1373, particularly FIG. 1a on page L1372), and wherein the specific surface therefore corresponds to the contour surface of the pigment grains, the inner surface is of significance for the specific surface given the phosphor pigment powder of the invention.

In the phosphor pigment powder of the invention, a multitude of non-saturated bonds are present at the surfaces due to the high specific surface, these unsaturated bonds leading to high sinter activity.

In particular, the phosphor pigment powders of the invention have specific surfaces greater than 10 m$^2$/g and between 20 m$^2$/g and 50 m$^2$/g, typically 35 m$^2$/g.

In an exemplary embodiment for manufacturing the phosphor pigment powder of the invention, an aqueous suspension of gadolinium oxide (Gd$_2$O$_3$) is produced. Sulfur dioxide is introduced into this aqueous suspension of gadolinium oxide. A clear solution of the hydrogen sulfite complex arises:

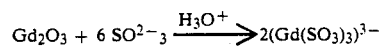

This solution is pumped through 0.2 μm filters for removing particles. After the addition of an aqueous solution of, for example, europium nitrate as a dopant additive (activator), the sulfur dioxide is removed by insufflation of nitrogen and heating to 100° C. The pH value thereby rises from 1 to 6, resulting in the gadolinium sulfite being completely precipitated out.

The following equation applies to the reaction:

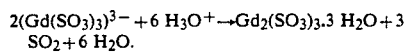

The process is implemented under a protective atmosphere in order to prevent the dissolved hydrogen sulfite complex from oxidizing into sulfate due to atmospheric oxygen.

The precipitate (gadolinium sulfite) is subsequently separated and dried at, for example, 120° C.

The dried gadolinium sulfite powder is built into an approximately 1 cm thick layer in quartz boats in a tubular kiln. The tubular kiln is closed gas-tight and rinsed with forming gas. For example, forming gas having the composition 80% $N_2$/20% $H_2$ is employed. The tubular kiln is heated to, for example, 700° C. The gadolinium sulfite is thereby reduced to gadolinium oxisulfide $Gd_2O_2S$.

A phosphor pigment powder having the total formula $(Gd_{1-x}Eu_x)_2O_2S$ with $x=0.03$ results due to the dopant additives.

Investigations have shown that the reduction of gadolinium sulfite to gadolinium oxisulfide can also be implemented by introducing CO, $H_2$ or forming gas having a composition other than that in the described exemplary embodiment. The temperature in the tubular kiln can thereby amount to between 400° C. and 800° C. It is especially advantageous to employ forming gas having the composition 80% $N_2$/20% $H_2$ at a temperature above 680° C. for the reduction, since a complete reduction then occurs.

Investigations have also shown that the resulting surface of the phosphor pigment powder is dependent on the temperature in the tubular kiln in the reduction of gadolinium sulfite to gadolinium oxisulfide. The specific surface decreases from 35 $m^2/g$ to 3 $m^2/g$ given temperatures between 680° C. and 1100° C. in the tubular kiln.

It is therefore advantageous to implement the reduction of gadolinium sulfite to gadolinium oxisulfide in the temperature range between 680° C. and 700° C. Optimum values with respect to completeness of the reduction and specific surface, i.e. sinter activity, are achieved in this temperature range.

The pigment powder that is obtained exhibits the desired, high specific surface of, for example, 35 $m^2/g$ but can still have foreign phase inclusions that do not correspond to the general total formula $(Gd_{1-x}Ln_x)_2O_2S$, wherein Ln stands for the activator and coactivator additives selected in the exemplary embodiment (europium and/or cerium). For completing the stoichiometry, a further, new reduction step can now be implemented. To that end, the pigment powder obtained as described above is exposed to a hydrogen/sulfur vapor atmosphere, with the same temperature conditions being selected for this step as for the first reduction step under a hydrogen atmosphere (forming gas). This treatment is also critical for the obtainable surface with respect to the selected temperature. Given excessively high temperatures, a reduced specific surface (according to BET) is obtained.

All foreign phases are converted into the desired oxisulfide with this additional hydrogen/sulfur vapor treatment, whereby the chemical reaction is unambiguous and no byproducts are observed. The size of the crystallites determined by x-ray diffractometry amounts to 10 through 20 nm.

Under inert gas, 0.1 weight percent (for example) of lithium germanium hexafluoride ($Li_2GeF_6$) is now added as a compression additive; the entire mass is then filled into an extrusion die of aluminum oxide and is subsequently pressed single-axis. The three-phase procedure that has already been set forth is selected for this purpose.

Figure 2:
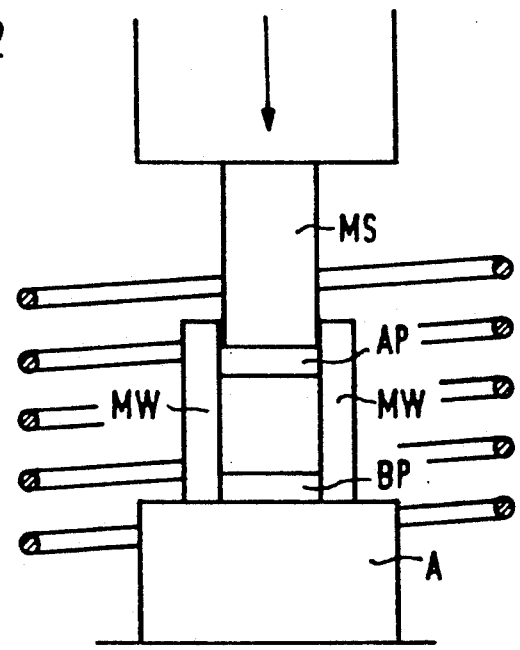
FIG. 2 shows an arrangement for hot-pressing in accordance with the principles of the present invention in a schematic cross-section.

FIG. 2 shows an apparatus suitable for hot-pressing. The pigment powder is filled into the extrusion die which is composed of bottom plate BP, die wall MW and cover plate AP and which, for example, is cylindrical. The pressing power is hydraulically produced and acts on the cover plate AP with the matrix die MS. The extrusion die rests on an anvil A. A heater H surrounding the extrusion die as well as a vacuum system (not shown) complete the hot-pressing arrangement.

Pre-pressing is first carried out dry and cold given a pressure of 1 through 3 $kN/cm^2$. The pre-compressed powder is subsequently heated to a temperature of 1100° through 1300° C. unpressurized in a hot-press, causing the pigment powder to sinter to approximately 80 through 85% of the theoretical density. Only after this is the ultimate pressing power of approximately 2 through 6 $kN/cm^2$ built up and the member of the sintered pigment powder is ultimately completely compressed.

Figure 3:
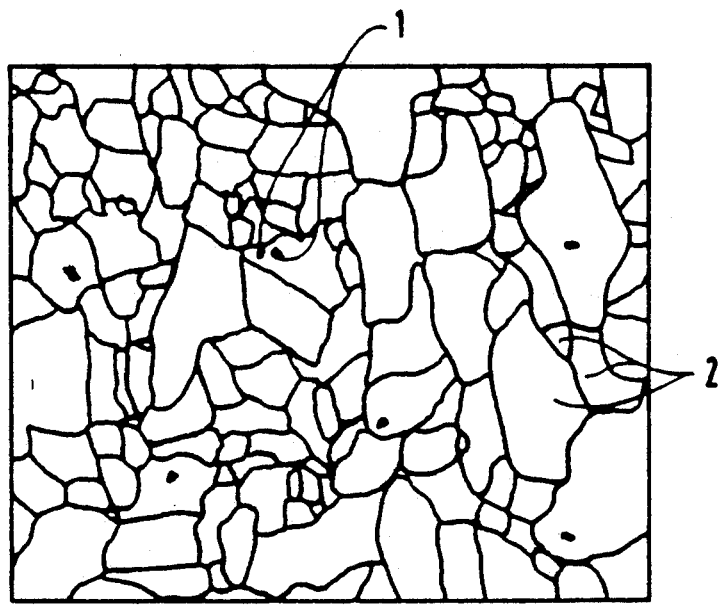
FIG. 3 shows a portion of a scintillator ceramic member manufactured in accordance with the principles of the present invention.

Subsequently, the sintered member is relieved, cooled and removed from the press and die. The scintillator ceramic produced in this way, which is shown in FIG. 3, is optically translucent, has a density of above 99.9% of the theoretical density and exhibits a regular globular through columnar grain structure. It has a high light emission for an effective radiation detection and can be employed, for example, as a detector element in x-ray computer tomography.

Due to the great similarity in chemical behavior, the method set forth for gadolinium oxisulfide can also be analogously implemented for other rare earth metals, for example, with yttrium and lanthanum instead of gadolinium and with at least one activator which is an element from the group of europium, cerium, praseodymium, terbium, ytterbium, dysprosium, samarium and holmium. Preferred activator/coactivator combinations are, for example, Eu/Ce, Eu/Pr, Eu/Tb and Pr/Ce. It is also possible to utilize a combination of three activators from the recited group.

The hot-pressing method of the invention leads to a scintillator ceramic within a few hours that, dependant on the system employed, can be manufactured without difficulty in any desired size, for example in wafers having the size of the palm of the hand. The previously known method of isostatic hot-pressing, by contrast, requires at least two days and results in a compact crystal member whose volume cannot be arbitrarily increased.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for producing a high-density scintillation ceramic of a rare earth oxisulfide, comprising the steps of:

providing a pigment powder having the general formula $(M_{1-x}Ln_x)_2O_2S$ wherein M is at least one element selected from the group consisting of Y, La and Gd, Ln is at least one element selected from the group consisting of Eu, Ce, Pr, Tb, Yb, Dy, Sm and Ho and $1\times10^{-6} \leq x \leq 2\times10^{-1}$, said powder having a specific surface of at least 10 $m^2/g$ determined with the gas absorption method according to BET; and compressing said pigment powder by single-axis hot-pressing to form a translucent ceramic member having a density of at least 99.9% of the theoretical density.

2. A method as claimed in claim 1 wherein the step of providing a pigment powder is further defined by providing a pigment powder having a specific surface in the range from 20 through 30 $m^2/g$ determined with the gas absorption method according to BET.

3. A method as claimed in claim 1 comprising the additional step of, before compressing said pigment powder, of pre-pressing said pigment powder dry and cold at a pressure of 0.1 through 10 kN $cm^{-2}$, and wherein the step of compressing said pigment powder is further defined by compressing said pigment powder at a temperature in the range from 1000° through 1500° C. and at a pressure in the range from 0.1 through 20 kN $cm^{-2}$.

4. A method as claimed in claim 3 wherein the step of pre-pressing said pigment powder is further defined by pre-pressing said pigment powder at a pressure in the range of from 1 through 3 kN $cm^{-2}$.

5. A method as claimed in claim 3 wherein the step of compressing said pigment powder is further defined by compressing said pigment powder at a temperature in the range from 1100° through 1300° C.

6. A method as claimed in claim 3 wherein the step of compressing said pigment powder is further defined by compressing said pigment powder at a pressure in the range from 2 through 6 kN $cm^{-2}$.

7. A method as claimed in claim 3 comprising the additional step, after said pre-pressing said pigment powder and before compressing said pigment powder, of heating said pigment powder to a temperature in the range from 1000° through 1500° C. unpressurized and thereby sintering said pigment powder to a density in the range from 75% through 90% of said theoretical density.

8. A method as claimed in claim 1 wherein the step of providing said pigment powder is further defined by providing a pigment powder produced by chemical precipitation of a rare earth sulfite from acid aqueous solution followed by a thermal reduction.

9. A method as claimed in claim 1 wherein the step of compressing said pigment powder is further defined by compressing said pigment powder in an extrusion die.

10. A method as claimed in claim 9 wherein the step of compressing said pigment powder in an extrusion die is further defined by compressing said pigment powder in an extrusion die comprising materials selected from the group consisting of aluminum oxide, tantalum, tungsten, molybdenum, silicon carbide and silicon nitride.

11. A method as claimed in claim 1 comprising the additional step of adding at least one of a compression additive or a sintering aid to said pigment powder before compressing said pigment powder.

12. A method as claimed in claim 1 wherein the step of compressing said pigment powder is further defined by hot-pressing said pigment powder under a residual gas pressure below 10 pa.

13. A method as claimed in claim 1 wherein the step of compressing said pigment powder is further defined by compressing said pigment powder in a gas atmosphere comprising a gas selected from the group consisting of nitrogen, argon, helium and hydrogen.

14. A method as claimed in claim 1 comprising the additional step of forming said ceramic member for use in an x-ray computer tomography apparatus.

* * * * *